United States Patent
Tanaka et al.

(10) Patent No.: US 9,789,814 B2
(45) Date of Patent: Oct. 17, 2017

(54) INDIRECT LIGHT-EMITTING FRONT GRILL

(71) Applicant: TOYODA GOSEI CO., LTD., Kiyosu-shi, Aichi-ken (JP)

(72) Inventors: Yoshiharu Tanaka, Kiyosu (JP); Moriyuki Hashimoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 216 days.

(21) Appl. No.: 14/822,969

(22) Filed: Aug. 11, 2015

(65) Prior Publication Data

US 2016/0090027 A1     Mar. 31, 2016

(30) Foreign Application Priority Data

Sep. 30, 2014   (JP) ................................ 2014-201077

(51) Int. Cl.
| | |
|---|---|
| *B60Q 1/28* | (2006.01) |
| *B60Q 1/50* | (2006.01) |
| *B60Q 1/26* | (2006.01) |
| *B60R 19/52* | (2006.01) |

(52) U.S. Cl.
CPC ............ *B60Q 1/50* (2013.01); *B60Q 1/2661* (2013.01); *B60R 2019/525* (2013.01)

(58) Field of Classification Search
CPC ........... B60Q 1/28; B60Q 1/2661; B60Q 1/50
See application file for complete search history.

(56) References Cited

U.S. PATENT DOCUMENTS

| | | | | |
|---|---|---|---|---|
| 1,998,680 | A * | 4/1935 | Lint ...................... | B60Q 1/05 362/502 |
| 2,403,856 | A * | 7/1946 | Gonzalez ............... | B60Q 1/26 362/502 |
| 5,887,672 | A * | 3/1999 | Kimura ................. | B60K 11/08 180/68.1 |
| 6,886,872 | B2 * | 5/2005 | Matsumoto ........... | B60R 19/12 293/115 |
| 6,986,597 | B2 * | 1/2006 | Elwell .................. | B60Q 1/2661 362/496 |
| 7,163,320 | B2 * | 1/2007 | Liu ...................... | B60Q 1/2661 362/469 |
| 7,537,253 | B2 * | 5/2009 | Rosen ................... | B60R 13/04 180/68.4 |

(Continued)

FOREIGN PATENT DOCUMENTS

| | | |
|---|---|---|
| JP | 5398044 B2 | 11/2013 |
| JP | 5448689 B2 | 1/2014 |

*Primary Examiner* — Elmito Breval
(74) *Attorney, Agent, or Firm* — Posz Law Group, PLC (57) ABSTRACT

Provided is an indirect light-emitting front grill including: a front grill 22; light-emitting members 4, 14; and illuminated members 1, 11 disposed along the design portion. The illuminated members 1, 11 have reflecting portions 2, 12 that reflect light emitted by the light-emitting members 4, 14. The reflecting portions 2, 12 are visible via the front grill viewed from the front, and have a black or dark color or the same color as or a similar color to the front grill 22. This front grill has openings 3, 13 through which currents of air introduced from outside the vehicle are further introduced into the inside of the vehicle, the openings being located nearer to the outer edges of the front grill 22 than to the reflecting portions 2, 12.

4 Claims, 4 Drawing Sheets

(56) References Cited

U.S. PATENT DOCUMENTS

| | | | |
|---|---|---|---|
| 2002/0096378 A1* | 7/2002 | Kobayashi | B60K 11/08 |
| | | | 180/68.6 |
| 2006/0104074 A1* | 5/2006 | Boniface | B60Q 1/2661 |
| | | | 362/496 |
| 2007/0058382 A1* | 3/2007 | Lan | B60Q 1/2661 |
| | | | 362/487 |
| 2010/0232174 A1* | 9/2010 | Arakawa | B60Q 1/2661 |
| | | | 362/547 |

* cited by examiner

INDIRECT LIGHT-EMITTING FRONT GRILL

TECHNICAL FIELD

The present invention relates to an indirect light-emitting front grill provided in a vehicle such as an automobile.

BACKGROUND ART

Recently, in order to specify a car manufacturer by the shape of a front grill provided on a front part of the vehicle body as of an automobile, the front grill has been used as icon. Therefore, in order that the shape of the front grill used as icon be more conspicuous, the peripheral edges of the front grill are garnished with plated molding.

However, in a dark place as at night, the shape of the front grill is not conspicuous even with the plated molding garnishes. Therefore, in order to make the shape of the front grill conspicuous even in a dark place as at night, a front grill illuminated by light emitted by lamps provided around the front grill is known.

For example, Patent Literature 1 discloses a vehicular body front part structure including: a front grill forming a design surface of the vehicular body front part and having grill openings used for guiding a current of air into an engine chamber; and lamps provided on the vehicle body rear side of the front grill, in order to emit light ahead of the vehicle body from the grill openings.

Additionally, Patent Literature 2 discloses a decoration method of a vehicle body in which molded light guides are arranged along the edge parts of decorated bodies, the decorated bodies being arranged inside and outside a vehicle body so as to be visible, and in which a plurality of LED light sources are arranged at predetermined intervals from which positions these light sources can emit light to the molded light guides. Patent Literature 2 describes, as examples of a decorated body, an emblem, and a wing-shaped component disposed between the front bumper and the front grill of the vehicle body.

CITATION LIST

Patent Literature

Patent Literature 1: JP 5448689 A
Patent Literature 2: JP 5398044 A

SUMMARY OF INVENTION

Technical Problem

However, in the technique described in Patent Literature 1, lamps provided on the vehicle body interior side of the front grill cover the opening of the front grill. Therefore, the area of the front grill opening, which is an air guide opening, decreases by the amounts corresponding to the lamps. Therefore, the function of taking outside air into the engine chamber, which is the original purpose of the front grill, is marred. That is, engine cooling may be adversely affected.

In the technique disclosed in Patent Literature 2, the molded light guides are visibly arranged in the opening of the front grill, which is a body to be decorated. Therefore, in a place as in daytime, the molded light guides are seen from the opening of the front grill. As a result, the appearance of the front grill may be marred. Moreover, since the molded light guides are located in the opening of the front grill, these molded light guides cover the opening of the front grill by amounts corresponding to them. Therefore, as with the technique described in Patent Literature 1, the function of taking outside air into the engine chamber is marred and, consequently, engine cooling may be adversely affected.

In view of the foregoing problems, the object of the present invention is to provide an indirect light-emitting front grill having the following advantageous effects: (1) a front grill serving as an icon is made conspicuous even in a dark place as at night by the providing light-emitting member, whereas when light are off as in daytime, the lighting member is rendered less conspicuous, thus enhancing the design of the front grill; (2) the design of the front grill is enhanced without marring the air guide function of the front grill, which is its original purpose.

Solution to Problem

In order to solve the foregoing problems, an indirect light-emitting front grill according to the present invention includes: a front grill having a front disposed on a vehicle front part and having a design portion, and a back on the opposite side to the front, back to back, and facing a vehicle interior; a light-emitting member disposed on the back side and opposite to the design portion, back to back; and an illuminated member having plate-like shape and located further inside the vehicle than the light-emitting member and disposed along the design portion, wherein the illuminated member has a reflecting portion that reflects light emitted by the light-emitting member, wherein the reflecting portion is visible via the front grill viewed from the front, and has a black or dark color or the same color as or a similar color to the front grill, and wherein the indirect light-emitting front grill has an opening through which currents of air introduced from outside the vehicle is further introduced into the inside of the vehicle, the opening being located nearer to the outside edges of the front grill than to the reflecting portion.

In this configuration, the light-emitting member is invisible from outside the vehicle viewed from the front because the light-emitting member is disposed on the back of the design portion. Accordingly, the design of the front grill can be enhanced by preventing the appearance of the front grill from being marred by the light-emitting member that would otherwise be visible.

Additionally, the illuminated member is disposed in places visible from outside the vehicle viewed from the front. When lights are off as in daytime, the inside of the front grill is dark as light does not reach it easily. Accordingly, the inside of the front grill cannot easily be seen usually. Accordingly, the illuminated member located inside the front grill is not easily visible.

In the indirect light-emitting front grill according to the invention, the illuminated member has a black or dark color or the same color as or a similar color to the front grill. Therefore, in a case where the illuminated member has a black or dark color, this color is assimilated into the darkness in the front grill. Accordingly, even where the illuminated member is disposed in visible places, this member is rendered less easily visible.

Meanwhile, in a case where the illuminated member has the same color as or a similar color to the front grill, the illuminated member is viewed as parts of the front grill. Accordingly, the color of the illuminated member is inconspicuous. That is, when lights are off as in daytime, the illuminated member do not mar the design of the front grill. Conversely, in a dark place as at night, the illuminated member enhances the design of the front grill.

Additionally, the indirect light-emitting front grill according to the invention has the opening through which currents of air introduced from outside the vehicle is further introduced into the inside of the vehicle, the opening being located nearer to the outer edges of the front grill than to the reflecting portion. Accordingly, currents of air introduced into the front grill can efficiently be sent into the engine chamber without being intercepted. Therefore, the design of the front grill can be enhanced without marring the light guide function of the front grill, which is its original purpose.

Advantageous Effects of Invention

As described above, the indirect light-emitting front grill according to the invention has the following advantageous effects: (1) the front grill serving as an icon is made conspicuous even in a dark place as at night by providing the light-emitting member, whereas when lights are off as in daytime, the lighting member is rendered less conspicuous, thus enhancing the design of the front grill; (2) the design of the front grill can be enhanced without marring the air guide function of the front grill, which is its original purpose.

DESCRIPTION OF EMBODIMENTS

Referring to FIGS. 1 to 4, preferred embodiments of an indirect light-emitting front grill according to the present invention will be described below. In FIGS. 1 to 4, front and rear, right and left, and upper and lower are directions viewed by an occupant of a vehicle, such as an automobile, in an advancing direction of the vehicle. In the drawings, identical members are labeled with identical signs and explanations thereof are omitted. The embodiments of the present inventions are described as especially useful forms to be realized, and the present invention is not limited thereto. Additionally, matters required to practice the present invention, which have not been described in this specification, should be understood as matters included in design made by those skilled in the art based on a known technique in this field. The present invention can be realized on the basis of contents disclosed herein and on the basis of common general knowledge in this field.

First Embodiment

As shown in FIGS. 1 to 4, an indirect light-emitting front grill A according to a first embodiment includes: a front grill 22, light-emitting members 4, 14, illuminated members (left-side illuminated member 1 and right-side illuminated member 11), and openings (left-side opening 3 and right-side opening 13).

Figure 1:
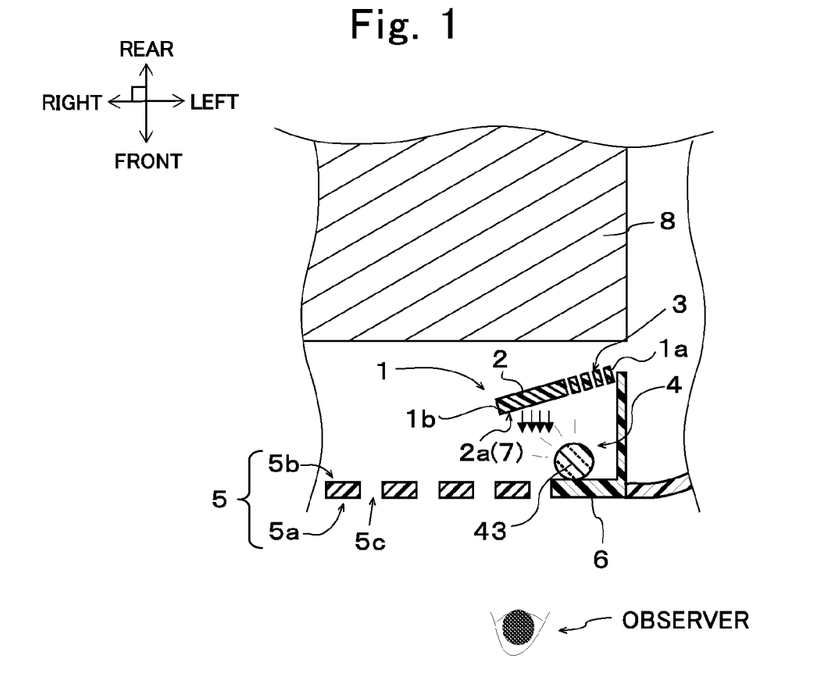
FIG. 1 is a schematic cross-sectional view of an indirect light-emitting grill according to a first embodiment, taken along the line I-I in FIG. 4.
Figure 2:
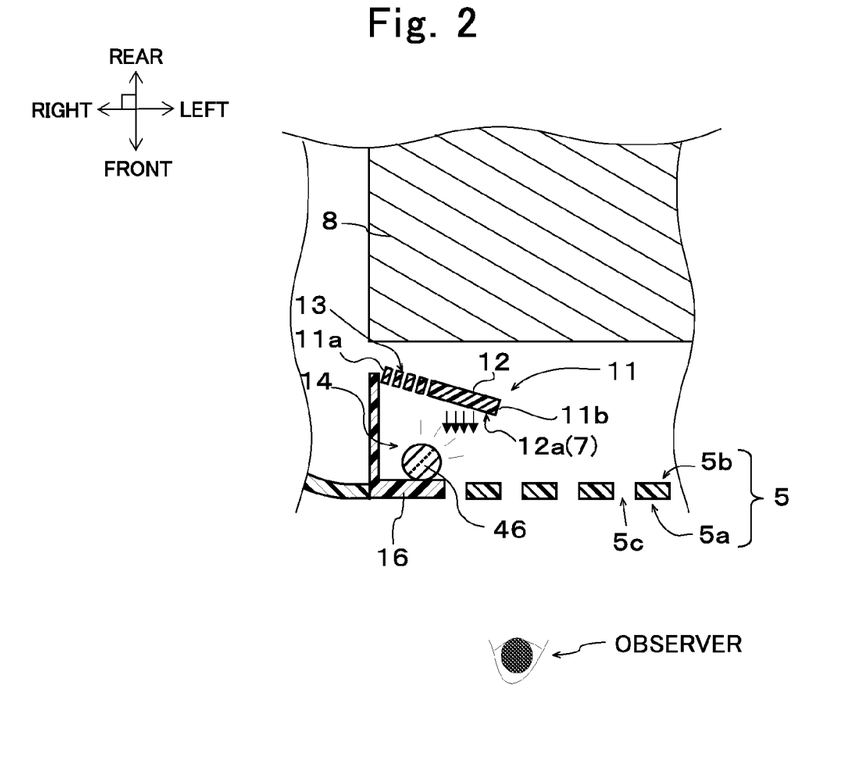
FIG. 2 is a schematic cross-sectional view of the indirect light-emitting grill according to the first embodiment, taken along the line II-II in FIG. 4.
Figure 3:
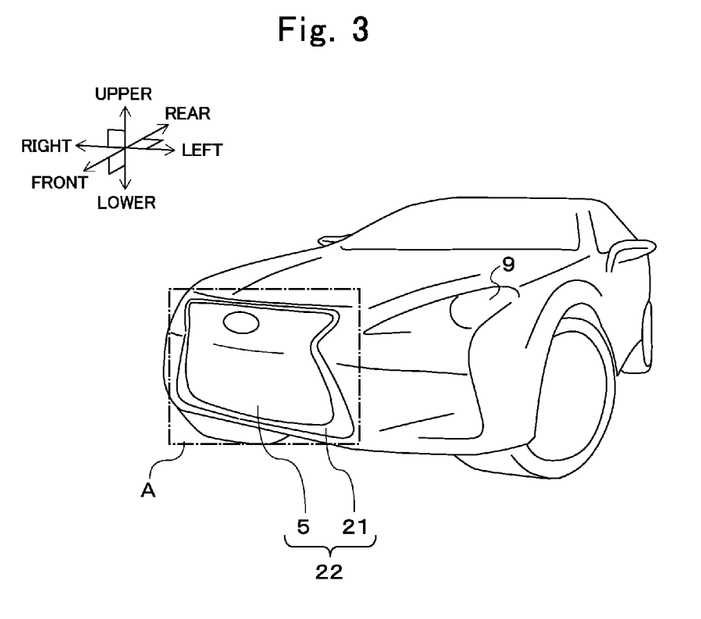
FIG. 3 is a schematic view of a vehicle in which the indirect light-emitting grill according to the first embodiment is applied.

The front grill 22 is an exterior member having vents 5c through which outside air is taken into an engine chamber 8 in a vehicle. Additionally, the front grill 22 has a design portion provided on a vehicle front part. As shown in FIGS. 1 and 2, a front 5a of the front grill 22, which faces the vehicle exterior, composes a design portion, whereas a back 5b on the opposite side to the front 5a, back to back, faces the vehicle interior (engine chamber 8).

The front grill 22 is disposed between the left and right front lamps 9 (the right front lamp is not shown) of the vehicle front part. The front grill 22 is an approximate rectangle symmetrical on the left and right sides with respect to a center line as viewed from the front, and has the shape of a bobbin winder spindle narrowing towards the inside in a position slightly above the middle in a vertical direction orthogonal to the direction of vehicle width (sideways direction).

Additionally, the front grill 22 has a three-dimensional shape curved like a bow so as to bulge in the direction of the vehicle front toward a narrow part located slightly above the middle from the upper and lower ends.

A radiator (not shown) is disposed behind (on the rear side of) the front grill 22, and the engine chamber 8 is provided behind the radiator. An engine (not shown) is accommodated in the engine chamber 8.

Figure 4:
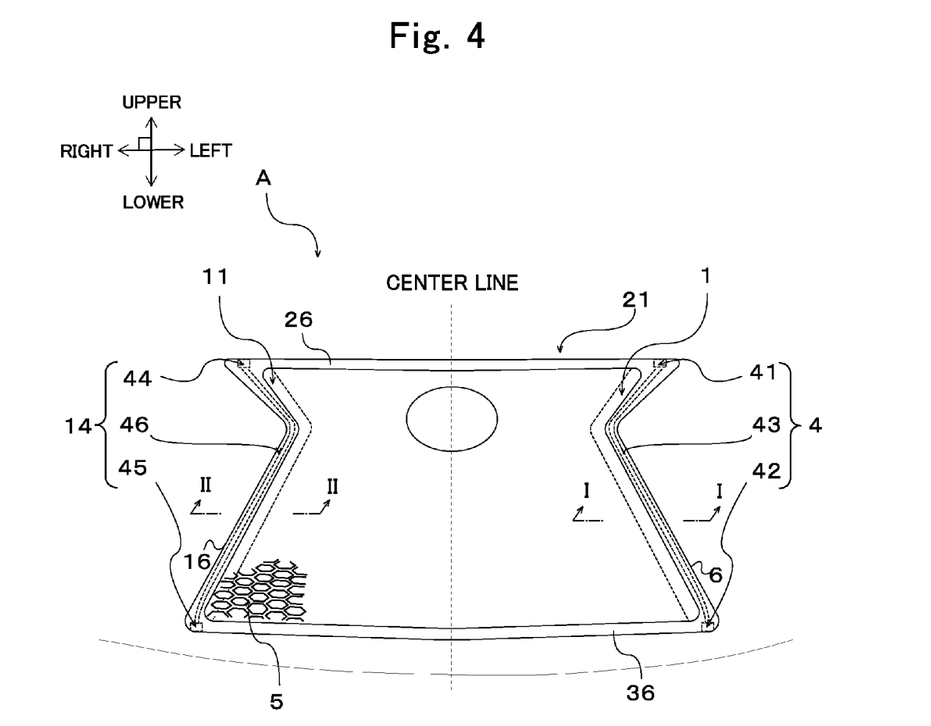
FIG. 4 is a schematic enlarged view of the indirect light-emitting grill according to the first embodiment shown in FIG. 3.

As shown in FIG. 4, the front grill 22 includes a frame body 21 serving as an outer edge portion and an air guide body 5 surrounded by the frame body 21. The frame body 21 has the shape of the outer edge of the front grill, thus composing a design portion. The frame body 21 is integrally formed by, for example, press working a metal material or injection molding a resin material. The frame body 21 is formed from a left frame part 6, right frame part 16, upper frame part 26, and lower frame part 36. In the frame part 21, the upper end of the left frame part 6 is connected with the left end of the upper frame part 26; the lower end of the left frame part 6 is connected with the left end of the lower frame part 36; the upper end of the right frame part 16 is connected with the right end of the upper frame part 26; and the lower end of the right frame part 16 is connected with the right end of the lower frame part 36. The design portion in the present embodiment means the left frame part 6 and right frame part 16, which exhibit distinctive features among the upper, lower, left, and right frame parts composing the frame body 21. The left frame part 6 and right frame part 16 are symmetrical on the left and right sides.

The air guide body 5 has a honeycomb form having vents 5c for introducing outside air into the engine chamber 8. The air guide body 5 is integrally formed by injection molding a resin material.

The light-emitting members 4, 14 are disposed on the back 5b of the front grill 22 and on the opposite side to the frame body 21, composing the design portion, back to back. Therefore, the light-emitting members 4, 14 are invisible from outside the vehicle viewed from the front. The light-emitting members 4, 14 include light guide bodies and light sources.

The light guide bodies include a left-side light guide body 43 disposed on the back of the left frame part 6 composing the frame body 21, and a right-side light guide body 46 disposed on the back of the right frame part 16.

The left- and right-side light guide bodies 43, 46 are cylindrical bodies of circular cross-section, and extend from upper to lower ends along the shapes of the corresponding frame parts on which they are disposed. That is, the left- and right-side light guide bodies 43, 46 are linearly symmetrical with respect to the center line.

Each of the left- and right-side light guide bodies 43, 46 is integrally formed by injection molding a light-transmitting resin material (e.g., acrylic resin, polycarbonate resin, or the like).

The light sources use LEDs (Light Emitting Diodes). The light sources include a left upper end light source 41, left lower end light source 42, a right upper end light source 44, and a right lower end light source 45.

In a vertical direction of the left-side light guide body 43, orthogonal to the direction of vehicle width (sideways direction), the left upper end light source 41 and left lower end light source 42 are disposed at the upper end and lower end respectively so as to be located opposite each other. The left upper end light source 41 and the left lower end light source 42 emit light into the left-side light guide body 43.

In a vertical direction of the right-side light guide body 46, orthogonal to the direction of vehicle width (sideways direction), the right-side upper end light source 44 and right-side lower end light source 45 are disposed at the upper end and lower end respectively so as to be located opposite each other. The right upper end light source 44 and the right lower end light source 45 emit light into the right-side light guide body 46.

Each light source emits light by its being supplied with power by a battery (not shown) via a harness (not shown) or light source drive circuit (not shown).

Light emitted by the left upper end light source 41 and left lower end light source 42 disposed at the upper and lower ends, respectively, of the left-side light guide body 43 is made incident on the inside of the left-side light guide body 43, using the upper and lower end faces of the left-side light guide body 43 as incident faces, and is guided in the left-side light guide body 43 in the lengthwise direction thereof. The light thus guided is emitted out of the light-transmitting left-side light guide body 43 from a side of the left-side light guide body 43.

Light emitted by the right upper end light source 44 and right lower end light source 45 disposed at the upper and lower ends, respectively, of the right-side light guide body 46 is made incident on the inside of the right-side light guide body 46, using the upper and lower end faces of the right-side light guide body 46 as incident faces, and is guided in the right-side light guide body 46 in the lengthwise direction thereof. The light thus guided is emitted out of the light-transmitting right-side light guide body 46 from a side of the right-side light guide body 46.

The illuminated members are reflecting materials for reflecting light from the light guide bodies. These illuminated members include the left-side illuminated member 1 and right-side illuminated member 11. Each illuminated member is a plate body integrally formed by injection molding a resin material. The left-side illuminated member 1 has a shape following the shape of the left frame part 6, and the right-side illuminated member 11 has a shape following the shape of the right frame part 16. Additionally, the left-side illuminated member 1 and left frame part 6 are integrally formed by injection molding. The right-side illuminated member 11 and right frame part 16 are also integrally formed by injection molding.

Reflecting portions include a left-side reflecting portion 2 and right-side reflecting portion 12. Reflecting faces include a left-side reflecting face 2a and right-side reflecting face 12a. The left-side illuminated member 1 has the left-side reflecting portion 2 with the left-side reflecting face 2a that reflects light from the left-side light guide body 43. The left-side reflecting portion 2 is located on the air guide body 5 side of the left-side illuminated member 1, and is disposed in a place where the left-side reflecting portion 2 is visible via the air guide body 5 of the front grill 22 as viewed from the front. The right-side illuminated member 11 has the right-side reflecting portion 12 with the right-side reflecting face 12a that reflects light from the right-side light guide body 46. The right-side reflecting portion 12 is located on the air guide body 5 side of the right-side illuminated member 11, and is disposed in a place where the right-side reflecting portion 12 is visible via the air guide body 5 of the front grill 22 as viewed from the front.

As shown in FIGS. 1 and 4, the left-side illuminated member 1 is located further inside the vehicle than the left-side light guide body 43 (i.e., in the rear in FIG. 1), and disposed along the shape of the left frame part 6. Additionally, the left-side illuminated member 1 is disposed at an angle in a sideways direction such that the left end 1a of the left frame part 6 is located further inside the vehicle (i.e., in the rear in FIG. 1) than the right end 1b of the air guide body 5 in a widthwise direction (i.e., in a sideways direction in FIG. 1) orthogonal to its lengthwise direction. That is, the left-side illuminated member 1 is disposed such that light reflected by the left-side reflecting face 2a is emitted out of the vehicle along the left frame part 6, which is nearer to the outer edge of the front grill.

As shown in FIGS. 2 and 4, the right-side illuminated member 11 is located further inside the vehicle (i.e., in the rear in FIG. 2) than the right-side light guide body 46, and disposed along the shape of the right frame part 16. Additionally, the right-side illuminated member 11 is disposed at an angle in the sideways direction such that the right end 11a of the right frame part 16 is located further inside the vehicle (i.e., in the rear in the figure) than the left end 11b of the air guide body 5 in a widthwise direction (i.e., in a sideways direction in FIG. 2) orthogonal to its lengthwise direction. That is, the right-side illuminated member 11 is disposed such that light reflected by the right-side reflecting portion 12 is emitted out of the vehicle along and nearer to the right frame part 16.

Therefore, light along the left-side light guide body 43, emitted to the left-side illuminated member 1, is reflected by the left-side reflecting face 2a and, thereby, an observer outside the vehicle can view the shape of the left frame part 6 composing the design portion. Similarly, light along the right-side light guide body 46, emitted to the right-side illuminated member 11, is reflected by the right-side reflecting face 12a and, thereby, an observer outside the vehicle can view the shape of the right frame part 16 composing the design portion. That is, the observer outside the vehicle can view the respective shapes of the left and right frame parts 6, 16, which are symmetrical on the left and right sides.

Each reflecting face has a rough face 7. The rough face 7 of the reflecting face is formed by a known method such as embossing. The reflecting face is able to diffuse light from the light guide body more widely by virtue of the rough face 7 of the reflecting face. Accordingly, an observer is able to view light reflected from the reflecting face, from a wider range of positions outside the vehicle. Therefore, the design of the front grill is advantageously improved.

Additionally, the rough faces 7 of the reflecting faces make it difficult for the light-emitting members 4, 14 to be shown on the corresponding reflecting faces even in a bright place as in daytime. Accordingly, the light-emitting members 4, 14 can be prevented from being shown to an observer via the corresponding reflecting faces. That is, the design of the front grill is not marred. Therefore, the design of the front grill can be improved even in a bright place as in daytime.

Each reflecting portion has a black or dark color or the same color as or a similar color to the front grill. A "dark color" herein can be specified by a Munsell color system (color specification according to their three attributes, in Japanese Industrial Standard (JIS) Z 8721) and can be determined by a comparison with, for example, a standard color chart based on the JIS Z 8721. A "dark color" indicates a color with lightness lower than 5 for example. Preferably, it is a color with lightness lower than 3.

Additionally, a "similar color" herein means a color with a color difference of 20 or smaller in the L*a*b* color system prescribed in the JIS Z 8729. Preferably, it is a color with a color difference of 7 or smaller.

The openings are the left-side opening 3 and right-side opening 13, and they introduce currents of air, introduced from outside the vehicle, into the inside of the vehicle. The left-side opening 3 is located nearer to the left frame part 6 than the left-side reflecting portion 2. In this embodiment, the left-side openings 3 is provided in the left end 1a of the left-side illuminated member 1. The right-side opening 13 is located nearer to the right frame part 16 than the right-side reflecting portion 12. In this embodiment, the right-side opening 13 is provided in the right end 11a of the right-side illuminated member 11.

Now, the operation of the indirect light-emitting front grill A according to the first embodiment will be described. When a power source is turned on by an operator, power is supplied to the light sources. When power is supplied to the light sources, the upper light source 41 disposed at the upper end of the left-side light guide body 43 emits light. Light emitted by the upper light source 41 is emitted to the outside of the vehicle from sides of the left-side light guide body 43 while being guided in the left-side light guide body 43 in a lengthwise direction thereof (in a vertical direction in the figure), using the upper end face of the left-side light guide body 43 as an incident face.

Similarly, when power is supplied to the light sources, the lower light source 42 disposed at the lower end of the left-side light guide body 43 emits light. Light emitted by the lower light source 42 is emitted to the outside of the vehicle from sides of the left-side light guide body 43 while being guided in the left-side light guide body 43 in a lengthwise direction thereof (in a vertical direction in the figure), using the lower end face of the left-side light guide body 43 as an incident face. In this way, the left-side light guide body 43 emits light.

When light emitted from the left-side light guide body 43 reaches the left-side reflecting portion 2 of the left-side illuminated member 1, this light is reflected by the left-side reflecting face 2a of the left-side reflecting portion 2. The left-side light guide body 43 is inclined in the direction of vehicle width such that the left end 1a is located on the vehicle interior side (i.e., on the rear side in FIG. 1) and the right end 1b is located on the vehicle exterior side (i.e., on the front side in FIG. 1). Additionally, the left-side reflecting face 2a of the left-side reflecting portion 2 is located so as to be visible via the air guide body 5 of the front grill 22 as viewed from the front. Furthermore, the left-side illuminated member 1 has a shape following the shape of the left frame part 6. Therefore, light emitted from the left-side guide body 43 is reflected by the left-side reflecting face 2a of the left-side illuminated member 1 and, thereby, an observer outside the vehicle can view the shape of the left frame part 6 composing the deigned portion. That is, even in a dark place as at night, an observer can view the shape of the left frame part 6 composing the design portion.

As with light reflected by the left-side illuminated member 1 to thereby make the shape of the left frame part 6 visible, light emitted from the right-side light guide body 46 is reflected by the right-side reflecting face 12a of the right-side illuminated member 11 and, thereby, an observer outside the vehicle can view the shape of the right frame part 16 composing the design portion. That is, even in a dark place as at night, an observer can view the shape of the right frame part 16 composing the design portion.

As described above, the indirect light-emitting front grill A according to the present embodiment makes it possible for an observer outside a vehicle to view, even in a dark place as at night, the symmetrical shapes of the left and right frame parts 6, 16 composing the design portion. Accordingly, the design of the front grill 22 in a dark place as at night can be enhanced.

Now, the advantageous effects of the indirect light-emitting front grill A according to the present embodiment will be described. In the indirect light-emitting front grill A according to the present embodiment, the light sources and light guide bodies are not disposed in the air guide body 5 of the front grill 22, but they are disposed in places that are invisible from outside the vehicle viewed from the front. That is, the vents 5c of the front grill 22 are prevented from being blocked. Accordingly, the function of introducing outside air into the engine chamber 8, which is the original purpose of the front grill 22, is prevented from being marred. Additionally, since light sources and light guide bodies are invisible when the lights are not on as in daytime, the appearance of the front grill 22 is prevented from being marred. Accordingly, the design taking into account a dark place as at night can be enhanced. Therefore, the design of the front grill 22 can be enhanced without marring the air guide function of the front grill 22, which is its original purpose.

When the lights are off as in daytime, the inside of the front grill 22 is dark as light does not reach it easily. Accordingly, the inside structure of the front grill 22 cannot usually be seen with ease. Therefore, although the reflecting portions of the illuminated members are disposed in visible places viewed from the front, these reflecting portions cannot easily be seen from outside the vehicle as they are located inside the front grill 22. Additionally, the reflecting portions of the illuminated members have a black or dark color or the same color as or a similar color to the front grill. Therefore, in a case where the illuminated members have a black or dark color, this color is assimilated into the darkness in the front grill 22. Accordingly, even where the illuminated members are disposed in visible places, these members are rendered less easily visible.

Meanwhile, in a case where the illuminated members have the same color as or a similar color to the front grill 22, the illuminated members are viewed as parts of the front grill 22 and are therefore inconspicuous. That is, when the lights are off as in daytime, the illuminated members do not mar the design of the front grill. Conversely, in a dark place as at night, the illuminated members enhance the design of the front grill.

The indirect light-emitting front grill A according to the present embodiment has the left-side opening 3 and right-side opening 13 on the front grill outer edge sides of the illuminated members. Accordingly, outside air guided from the outside of the vehicle to the inside thereof can be passed into the engine chamber 8 through the left- and right-side openings 3, 13 without being intercepted. That is, the air guide function of the front grill 22, which is its original purpose, is prevented from being marred. Therefore, the design of the front grill 22 can be enhanced without marring the air guide function of the front grill 22, which is its original purpose.

In the indirect light-emitting front grill A according to the present embodiment, the respective reflecting faces of the reflecting portions of the illuminated members have rough faces. By virtue of these, the reflecting faces are able to further diffuse light from the light guide bodies toward the outside of the vehicle. Accordingly, the design of the front grill 22 in a dark place as at night can be further enhanced.

An indirect light-emitting front grill according to one embodiment of the present invention has been described above. However, the indirect light-emitting front grill A according to the present invention is not limited to the foregoing embodiment.

For example, the air guide body 5 of the front grill 22 according to the present embodiment may have, instead of a honeycomb form, a form of horizontal or vertical grill louver, or a form of vertical and horizontal grill, oblique grill, fret, net, or the like.

The light emitting members 4, 14 and illuminated members according to the embodiment are provided on the left frame part 6 and right frame part 16 of the frame body 21. However, the light-emitting members may be provided in correspondence with all the outer edges of the frame body, including the upper and lower frame parts 26, 36 as well.

Instead of the shape of the front grill 22 according to the present embodiment, the front grill may have a shape such as a trapezoidal shape in which the upper frame part 26 is longer than the lower frame part 36 in the direction of vehicle width; a shape in which two ellipses long in the direction of vehicle width are arranged side by side; and a semicircular shape having an arc in a lower position.

The light-emitting members 4, 14 according to the present embodiment emit light to the illuminated members 1, 11 respectively by use of the light guide bodies 43, 46 respectively. However, without using the light guide bodies 43, 46, the illuminated members may be illuminated by disposing a plurality of light sources on the back of the frame body 21.

Figure 5A:
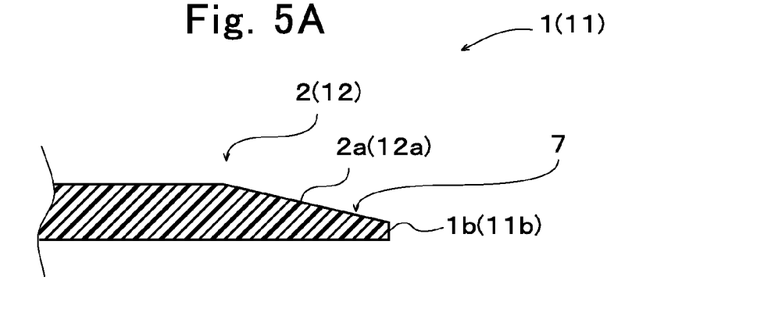
FIG. 5A is a schematic cross-sectional view as an example of reflecting portions of illuminated members in the indirect light-emitting grill according to the first embodiment.
Figure 5B:
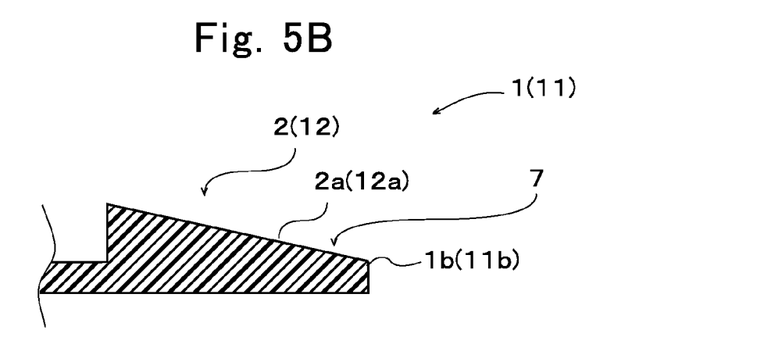
FIG. 5B is a schematic cross-sectional view as another example of the reflecting portions of the illuminated members in the indirect light-emitting grill according to the first embodiment.
Figure 5C:
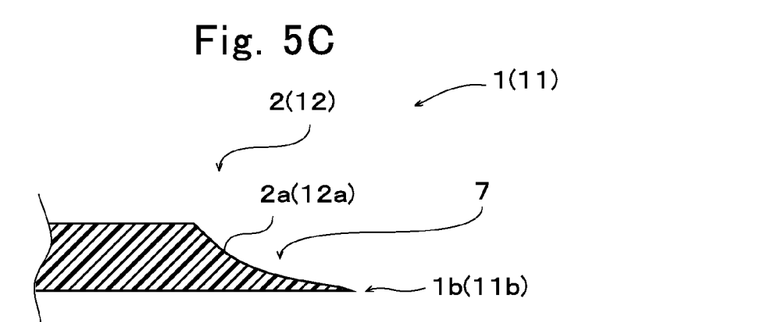
FIG. 5C is a schematic cross-sectional view as another example of the reflecting portions of the illuminated members in the indirect light-emitting grill according to the first embodiment.
Figure 5D:
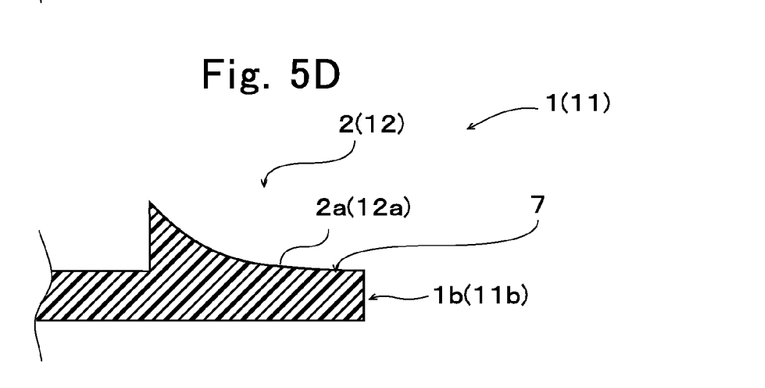
FIG. 5D is a schematic cross-sectional view as another example of the reflecting portions of the illuminated members in the indirect light-emitting grill according to the first embodiment.

Each illuminated member according to the embodiment is disposed in an inclined manner such that light from the light guide body is reflected to the corresponding outer edge of the front grill. Instead of this, the reflecting face of the reflecting portion, which is part of the illuminated member, may have an inclined flat face (FIGS. 5A and 5B) or curved face (FIGS. 5C and 5D). In this case, the illuminated members do not have to be sideways inclined but may be disposed parallel to the air guide body 5.

The reflecting portions according to the present embodiment have the same color as or a similar color to the front grill 22. For example, if the color of the frame body 21 or air guide body 5 of the front grill 22 is silver, it is preferable that the color of reflecting portions be silver, gray, or the like. Alternatively, if the color of the frame body 21 or air guide body 5 of the front grill 22 is white, it is preferable that the color of the reflecting portions be white, cream, or the like.

REFERENCE SIGNS LIST

1: LEFT-SIDE ILLUMINATED MEMBER
11: RIGHT-SIDE ILLUMINATED MEMBER
2: LEFT-SIDE REFLECTING PORTION
2a: LEFT-SIDE REFLECTING FACE
12: RIGHT-SIDE REFLECTING PORTION
12a: RIGHT-SIDE REFLECTING FACE
3: LEFT-SIDE OPENING
13: RIGHT-SIDE OPENING
4, 14: LIGHT-EMITTING MEMBERS
5: AIR GUIDE BODY
5a: FRONT
5b: BACK
7: ROUGH SURFACE
21: FRAME BODY
22: FRONT GRILL

The invention claimed is:

1. An indirect light-emitting front grill comprising:
a front grill having a front disposed on a vehicle front part and having a design portion, and a back on the opposite side to the front and facing a vehicle interior;
a light-emitting member disposed on the back side and opposite to the design portion; and
an illuminated member having plate-like shape and located further inside the vehicle than the light-emitting member and disposed along the design portion;
wherein the illuminated member has a reflecting portion that reflects light emitted by the light-emitting member;
wherein the reflecting portion is visible via the front grill viewed from the front, and has a black or dark color or the same color as or a similar color to the front grill; and
wherein the indirect light-emitting front grill has an opening through which currents of air introduced from outside the vehicle is further introduced into the inside of the vehicle, the opening being located nearer to the outer edge of the front grill than to the reflecting portion.

2. The indirect light-emitting front grill according to claim 1, wherein:
the front grill comprises a frame body serving as an outer edge portion, and an air guide body surrounded by the frame body;
the design portion is the frame body, and
the reflecting portion of the illuminated member is located opposite the air guide body.

3. The indirect light-emitting front grill according to claim 1, wherein the reflecting portion has a reflecting face that reflects light to the outer edge of the front grill.

4. The indirect light-emitting front grill according to claim 1, wherein the reflecting portion of the illuminated member has a rough face.

* * * * *